United States Patent [19]

Donnelly

[11] Patent Number: 4,828,782
[45] Date of Patent: May 9, 1989

[54] APPARATUS AND METHOD FOR INSPECTION OF FUEL ASSEMBLIES

[75] Inventor: Thomas J. Donnelly, Columbia, Md.

[73] Assignee: BBC Brown Boveri Nuclear Services, Columbia, Md.

[21] Appl. No.: 70,705

[22] Filed: Jul. 7, 1987

[51] Int. Cl.⁴ .......................................... G21C 17/06
[52] U.S. Cl. .................................. 376/252; 73/623; 73/866.5
[58] Field of Search ................ 73/623, 866.5; 376/252

[56] References Cited

U.S. PATENT DOCUMENTS

| 3,823,068 | 7/1974 | Worlton et al. | 376/450 |
| 4,172,492 | 10/1979 | Abell et al. | 165/11 |
| 4,193,843 | 3/1980 | Womack et al. | 376/252 |

FOREIGN PATENT DOCUMENTS

| 0051016 | 5/1982 | European Pat. Off. | 376/252 |
| 2547472 | 4/1977 | Fed. Rep. of Germany | 73/623 |
| 2287753 | 6/1976 | France | 376/252 |
| 51-1893 | 1/1976 | Japan | 376/252 |
| 52-27989 | 2/1977 | Japan | 376/252 |

Primary Examiner—Charles T. Jordan
Assistant Examiner—Richard W. Wendtland
Attorney, Agent, or Firm—Ostrolenk, Faber, Gerb & Soffen

[57] ABSTRACT

An arrangement for inspecting the fuel assemblies of boiled water reactors using an ultrasonic transducer probe. Each assembly contains a square array of fuel rods covered by a fuel channel slip. The probe accesses the fuel rods through a nosepiece in the shape of an inverted tripod located at the bottom of each assembly. The fuel rods are supported in each assembly by upper and lower tie plates, in the form of grids. The grids have first apertures for supporting the ends of the fuel rods, and second apertures which allow coolant water to flow between the fuel rods during operation. The probe is inserted through the second apertures of the lower tie plate grid, and rotated to inspect each of the four surrounding fuel rods for the presence of water inside the fuel rods. In order to access each of the second apertures in the fuel assembly, the probe is pivoted about a single pivot point in the nosepiece, the pivot point preferably being located in the trident which is non-symmetric with respect to the array of fuel rods. However, it can be located in any of the tridents or even slightly below the tripod. Moreover, multople single pivot points, one in each trident, can be provided to allow multiple inspections to occur in parallel.

28 Claims, 4 Drawing Sheets

APPARATUS AND METHOD FOR INSPECTION OF FUEL ASSEMBLIES

BACKGROUND OF THE INVENTION

1. Field of the Invention

The present invention relates to the inspection of fuel assemblies in nuclear power plants and, more specifically, to an arrangement for inspecting fuel rods of boiled water reactors using an ultrasonic transducer which does not require removal of the fuel channel slip encasing the fuel rods.

2. Description of the Related Art

Two types of nuclear fuel reactors are primarily used in the nuclear power industry: pressurized water reactors (PWR) and boiling water reactors (BWR). The nuclear fuel for either of these type of reactors is housed in fuel assemblies containing an array of fuel rods, each fuel rod in turn containing the fissionable material used to power the reactor. The fuel assemblies are submerged in circulating coolant water during operation, and are designed to efficiently transfer the generated fission heat to the coolant water.

The conventional technique for testing leakage from the fuel rods of both PWR and BWR reactors is to sip the water surrounding the fuel rods, and then test the water for radioactivity. Three different types of sipping methods exist: wet sipping, dry sipping and a more recent technique of vacuum sipping, to which U.S. Pat. No. 4,034,599 assigned to General Electric Co., is directed.

In a typical vacuum sipping cycle, the fuel assembly is inserted in an isolation chamber, which is then sealed and flushed with either demineralized or reclaimed water. In preparation for testing, a gas space is established above the fuel assembly by releasing a small quantity of water from the chamber while injecting air at the top at a slightly higher than pool pressure. This gas is then evacuated by a vacuum pump and passed through an in-line beta scintillation detector.

Although vacuum sipping is faster than either wet or dry sipping because sample acquisition and laboratory analysis steps are eliminated, all three sipping techniques merely detect the presence of fissionable material which has leaked into the coolant water. None of the sipping techniques isolate a problem to a particular fuel rod, and thus all require subsequent removal and testing of all fuel rods in the assembly.

In view of the above drawback, a subsidiary related to the assignee of the present application developed a failed fuel rod detection system for PWR reactors employing an ultrasonic transducer in the form of a two-fingered probe which traverses horizontally through each row of the rod array. The probe transmits an ultrasonic pulse and can detect and localize the presence of minor quantities of water inside each individual fuel rod from the received signal. The presence of water implies a through-wall defect in the particular fuel rod, indicating a fuel rod failure. This ultrasonic apparatus and technique, covered by U.S. Pat. No. 4,193,843 to Womack et al., issued Mar. 18, 1980, is much more accurate than sipping, and provides to the user a real time plot of the PWR fuel assembly showing the actual location and analysis of each of the rods. Thus, no fuel assembly dismantling is necessary for inspection/detection.

Although the above-described failed fuel rod detection system could conceivably be used to inspect all types of light water reactor assemblies (both PWR and BWR), the rod assemblies of BWR reactors are typically encased with a fuel channel slip, and thus inaccessible to a horizontal probe. It is possible to remove the fuel channel slip of BWR reactors to test the fuel rods, but such disassembly is highly undesirable. As shown in FIG. 1, the only entrance aperture for testing the fuel rods in BWR assemblies without removing the slip is at the bottom, through the nosepiece 2. However, the nosepiece has only about a 3½ inch diameter opening, thus partially obscuring direct access to the outer fuel rods from beneath. An inverted tripod extending across this opening in the nosepiece makes access to the individual fuel rods even more difficult.

SUMMARY OF THE INVENTION

Accordingly, it is an object of the present invention to provide an arrangement for the inspection of BWR fuel rod assemblies in which the fuel rods are accessed through the nosepiece of the assembly.

Another object of the invention is to provide an arrangement for inspecting BWR fuel rods which isolates a leakage problem to a particular fuel rod.

A further object of the invention is to provide an arrangement for inspecting BWR fuel assemblies which is highly accurate and requires minimal re-inspection.

These and other objects are achieved by the present invention, comprising an inspection arrangement for BWR fuel assemblies in which an ultrasonic transducer probe is inserted through the nosepiece in the shape of an inverted tripod located at the bottom of each fuel assembly. The fuel rods are supported in each assembly by upper and lower tie plates, in the form of grids. The grids have first apertures for supporting the ends of the fuel rods, and second apertures to allow coolant water to flow between the fuel rods during operation. The probe is inserted up through the second apertures of the lower tie plate grid. The probe may be successively inserted in each second apertures or, preferably, the probe may be inserted only in one of every four apertures and rotated to inspect each of the four surrounding fuel rods for the presence of water. In order to access the second apertures in the fuel assembly covered by the nosepiece, the probe is pivoted about a single pivot point, the pivot point being located in the trident of the nosepiece which is non-symmetric with respect to the array of fuel rods. The pivot point is preferably positioned centrally in the non-symmetric trident. However, the pivot point can also be positioned in any trident or below the tripod. Moreover, multiple single pivot points, one in each trident, can be provided to allow multiple inspections in parallel.

In the preferred embodiment of the invention, the probe passes through a ball joint located at the single pivot point. In this arrangement, the lower end of the probe may be moved at its lower end by an x-y scanning bridge to cause the probe to pivot at the ball joint.

In a second embodiment, the probe is seated in a two-stage goniometric cradle which, when rotated, cause the probe to pivot about the single pivot point.

In a third embodiment, the probe is seated in a goniometric cradle disposed on a rotational table which, when rotated, causes the probe to pivot about the single pivot point.

Other features and advantages of the invention are described below, with reference to the accompanying drawings.

DETAILED DESCRIPTION OF THE PREFERRED EMBODIMENT

Figure 1:
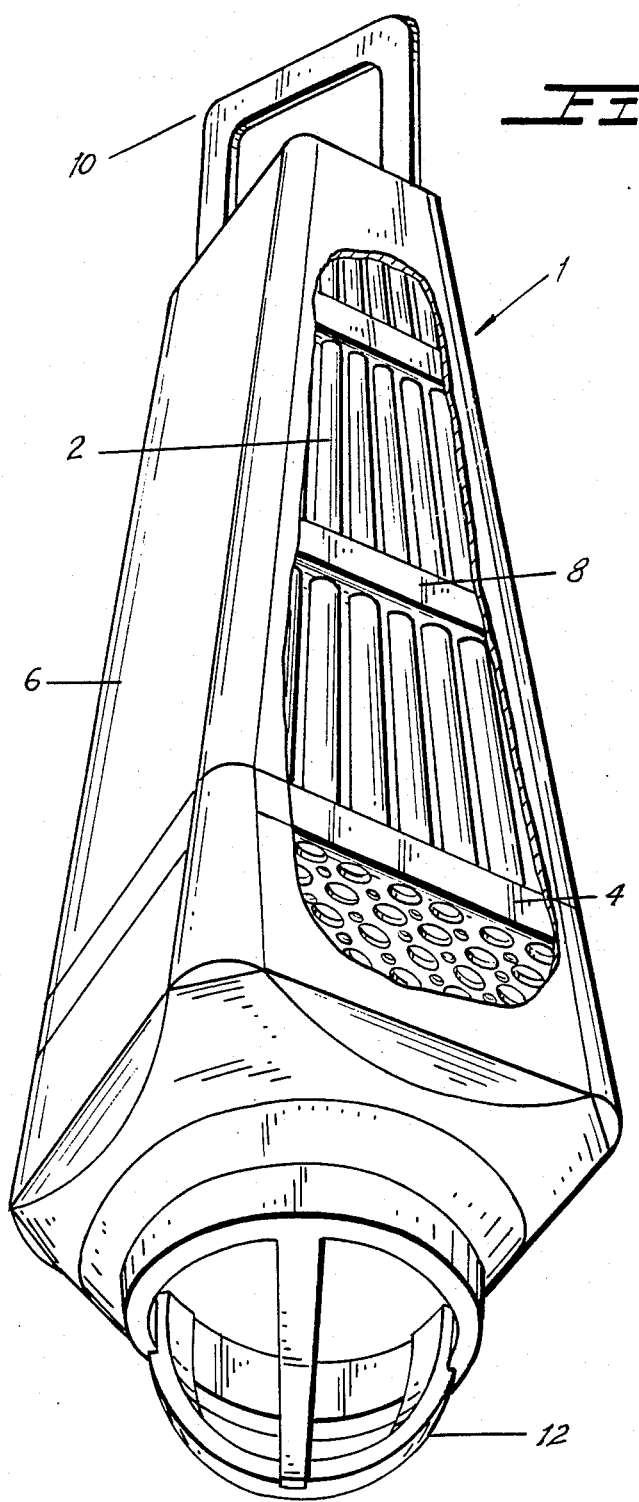
FIG. 1 shows a typical BWR fuel assembly.

Referring first to FIG. 1, a typical BWR fuel assembly is shown, designated generally by numeral 1. The essential components of a BWR fuel assembly are: an array of fuel rods 2, an upper tie plate (not shown), a lower tie plate 4 and a fuel channel slip 6, and a number of fuel rod spacers 8. The fuel rods 2 are supported in a square array by the lower and upper tie plates. The fuel rod array ("the fuel bundle") typically comprises either a $7 \times 7$, $8 \times 8$, or a $9 \times 9$ square. For purposes of example, the fuel bundle will hereafter be assumed to comprise an $8 \times 8$ array.

The fuel channel slip 6 fits around the fuel bundle to form the fuel assembly. The entire assembly typically weighs about 700 pounds and has a 5.33 inch outside dimension.

The upper tie plate is a stainless steel, machined gridwork casting. The casting maintains the regular arrangement of fuel rods within a fuel rod assembly. The casting has welded to it a lifting bail 10 used for movement of the assembly.

The lower tie plate 4 is also a stainless steel casting that provides grid holes for the fuel rod end plugs. Coolant flow is directed through the holes in the nosepiece into the lower tie plate grid 4, which distributes the flow to the fuel bundle.

The fuel rod spacers 8 maintain even lateral spacing of the fuel rods 2, and suppresses fuel rod vibration. Each spacer 8 is a lattice with finger springs that press laterally against the walls of the fuel rods.

Figure 2:
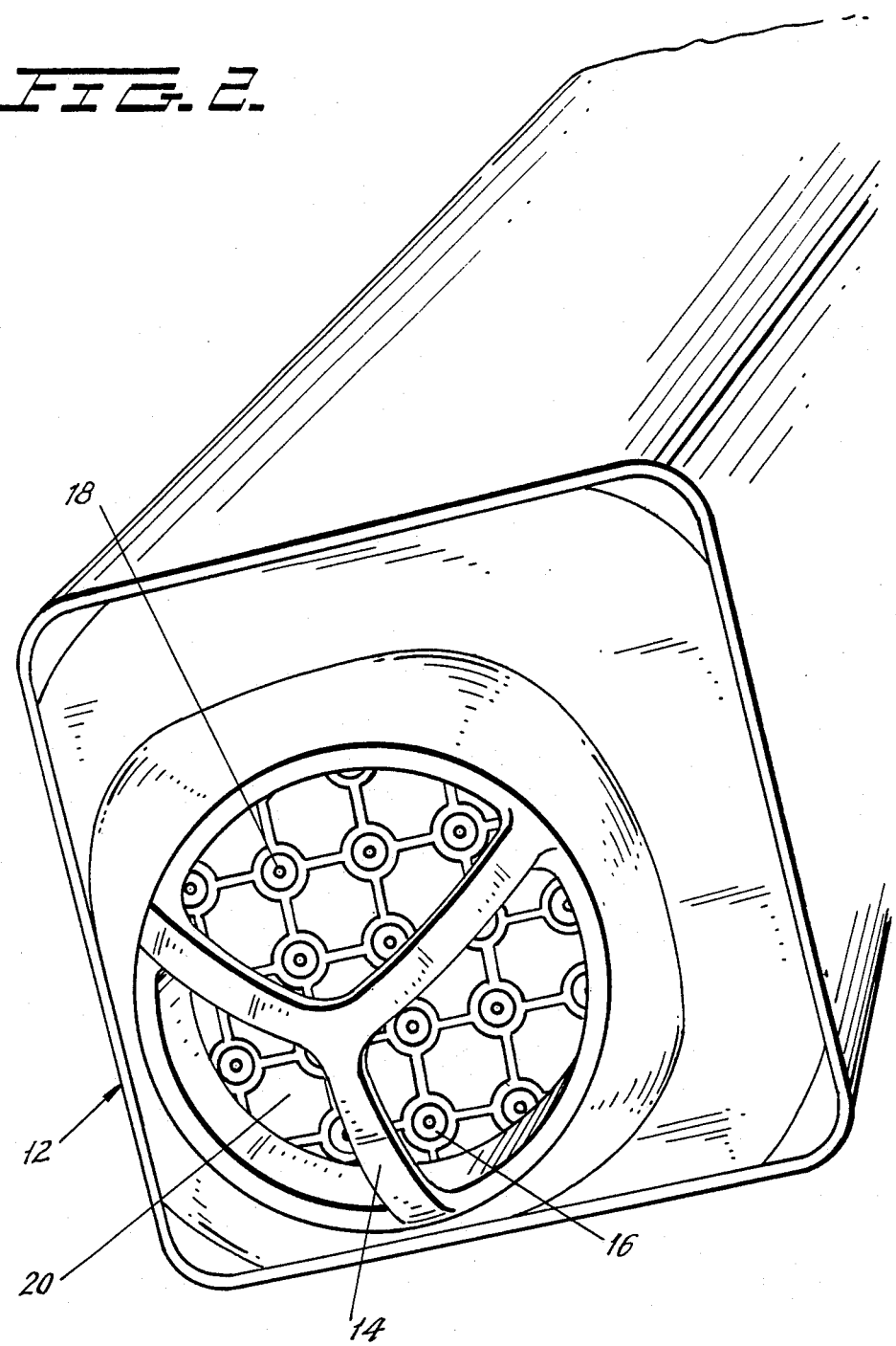
FIG. 2 shows a bottom view of the lower tie plate and nosepiece of the BWR assembly.

Referring now to FIG. 2, a bottom view of the BWR fuel assembly is shown. A nosepiece 12 with an inverted tripod 14 extends downward from the fuel assembly 1. Looking up into the fuel assembly, the lower tie plate 4 can be seen, comprising a grid having a plurality of first apertures 16 for housing the end plugs 18 of each fuel rod 2, and a plurality of slightly larger second apertures 20 which allow coolant water to flow between the fuel rods during operation. In the exemplary $8 \times 8$ fuel assembly, there are 64 first apertures 16 and 49 second apertures 20.

In accordance with the present invention, an ultrasonic probe is inserted up through the tripod 14 and successively inserted into any of the second apertures 20. While the probe could be inserted into all 49 second apertures it is actually only necessary to access 16 of the second apertures (depicted in FIG. 3 with small circles and identified by reference numeral 20A) since the probe can be rotated in each aperture 20A to examine each of the fuel rods in the surrounding first apertures 16. As is evident from FIG. 2, many of the apertures are obstructed by the nosepiece cover and the presence of the inverted tripod. Accordingly, in the present invention, a flexible probe passes through a single pivot point in or slightly below the tripod to facilitate access to each of the apertures 20.

Figure 3:
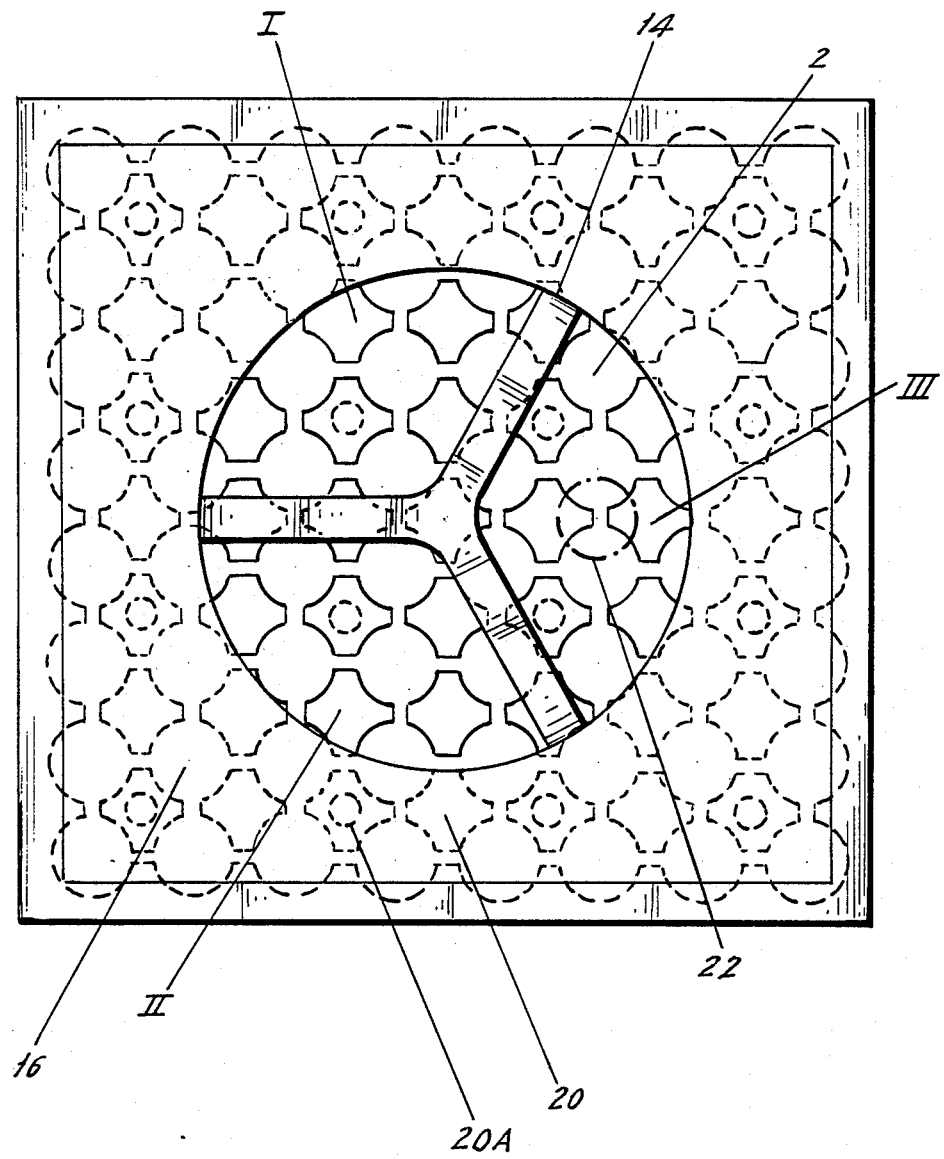
FIG. 3 shows a representation of the lower tie plate grid, the inverted tripod, and the preferred location of the single pivot point of the present invention.

Referring now to FIG. 3, a simplified representation of the lower tie plate 4 is portrayed, showing the location of each of the 64 fuel rods in the exemplary $8 \times 8$ array of the BWR fuel assembly. As can be seen from FIG. 3, only 16 of the fuel rods are substantially visible through the nosepiece from a straight bottom view of the fuel assembly. The inverted tripod 14 forms three tridents I, II and III with respect to the exposed fuel rods. As is evident from FIG. 3, tridents I and II are symmetrical with respect to the fuel rods, while trident III is non-symmetric.

The present inventor has found that if the probe passes through a single pivot point 22 in or slightly below trident III, the non-symmetric trident, each of the fuel rods can be readily accessed by passing the probe into any of the 49 second apertures 20, or preferably only the 16 apertures 20A (if the probe is rotated). Moreover, the present inventor has found that if this single pivot point 22 is located substantially centrally in or slightly below trident III, the access to each of the apertures 20 is made most accessible. Multiple single pivot points, one in each trident, can also be provided to allow multiple inspections to occur in parallel.

Figure 4:
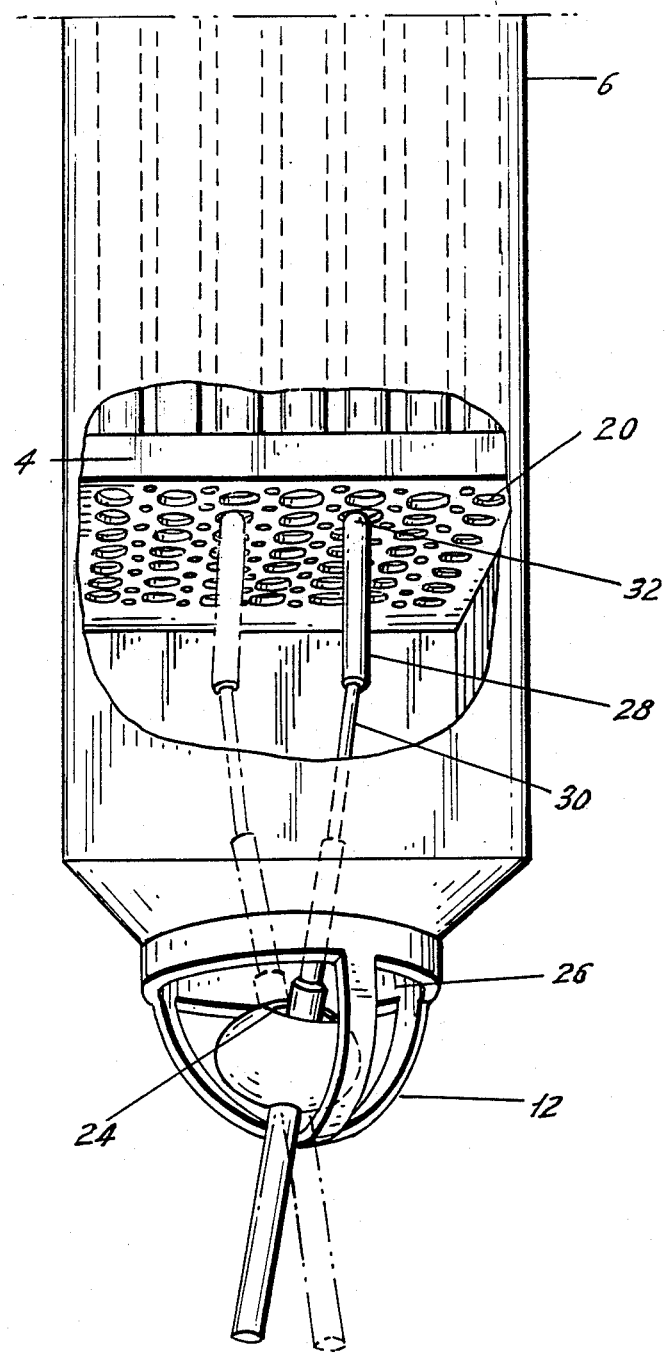
FIG. 4, shows an embodiment of the invention in which the probe of the invention passes through a ball joint located at the pivot point.

In order to rotate the probe about the pivot point, many different embodiments of the present invention are possible, three of which are described herein. In a first embodiment, shown in FIG. 4, a fixed ball joint 24 is located at the pivot point 22. The ball joint 24 has an aperture 26 through which the probe 28 passes, and the probe is pivoted at its lower end by means of an x-y scanning bridge (not shown in FIG. 4).

Alternatively, in a second possible embodiment of the invention, the probe is seated at its lower end in a two-stage goniometric cradle which, when rotated, pivots the probe about the single pivot point. In a still further embodiment of the invention, the probe is seated in a goniometric cradle disposed on a rotational table, which, when rotated, causes the probe to pivot about the single pivot point. In either of these last two embodiments, the center of rotation of the cradle must be located external to the body of the cradle, preferably about 9 inches up.

In order to access the apertures 20 from a single pivot point, the probe 28 of the present invention has a flexible midsection 30 which allows it to bend. The probe is provided with a bullet-shaped nose 32 to guide the probe into each opening, and to protect the probe as it contacts the edge of each aperture 20.

In the preferred embodiment, a Krautkrammer transducer serves as the active UT portion of the probe 28 in the preferred embodiment, although any appropriate commercially available ultrasonic device may be used. Probe 28 may utilize one transducer which both sends and receives the ultrasonic signal, or separate transmit and receive transducers may be provided. The probe operates by sending out ultrasonic signals which vibrate the outer shell of the fuel rod; the presence of water inside the fuel rod will affect the vibration of the outer shell of the fuel rod, but more significantly, will dampen the amplitude of the reflected ultrasonic signal.

To test the fuel rods, the probe is rotated until a maximum signal is received. In the preferred embodiment of the invention, the return ultrasonic signal is integrated, and a threshold detector is used to determine whether the signal is of appropriate strength, indicating no water in the particular fuel rod. The amplitude of the return signal must be greater than a prescribed threshold value for a fuel rod to pass. The probe is then rotated 90° to test the next fuel rod, and so on around the entire 360°. Alternately, the probe may be rotated continuously through the entire 360°, and the rods' return signal captured on the fly. Next, the probe is brought down beneath the aperture 20, pivoted about the single pivot point, and reinserted into the next aperture, and so on until all the fuel rods of the assembly have been tested.

The novel arrangement of the present invention allows each fuel rod to be examined individually and therefore isolates a leakage problem to a particular fuel rod. The arrangement of the present invention is also extremely accurate, requiring a reinspection rate of only 0.05%, as compared to a typical reinspection rate of 1.5% for the previously-described vacuum sipping techniques.

Although the present invention has been described in connection with a plurality of preferred embodiments thereof, many other variations and modifications will now become apparent to those skilled in the art. For example, the novel positioning design of the invention can be used to position other tools in the nosepiece, at the bottom of the fuel rods, or in the flow paths between the fuel rods to perform other inspection or maintenance tasks (e.g., visual inspection, machining and polishing operations, welding operation, debris retrieval tasks, rod to rod gap measurements, crud sampling and removal, fuel rod dimensioning, eddy current inspection transducers, Electro Magnetic Acoustic Transducer inspection, rod reactivity measurements, serial number verification, inspection of lower fuel spacers, rod vibration, oxide measurements, flow channel blockage analysis and temperature measurements).

It is preferred, therefore, that the present invention be limited not by the specific disclosure herein, but only by the appended claims.

What is claimed is:

1. An apparatus for the inspection of boiling water reactor fuel assemblies, each fuel assembly comprising a plurality of fuel rods and upper and lower tie plates, said upper and lower tie plates each comprising grids having first apertures for supporting the respective upper and lower ends of said fuel rods and having second apertures which allow coolant water to flow between said fuel rods, said fuel assembly further comprising on its lower end, adjacent to and covering said lower tie plate, a nosepiece in the shape of an inverted tripod, said apparatus comprising:
    (a) a probe for detecting and localizing the presence of water inside said fuel rods; and
    (b) a ball joint disposed below said lower tie plate, said ball joint having a central aperture through which said probe passes, said probe being pivotable about said ball joint and insertable into each of said second apertures for detecting and localizing the presence of water inside said fuel rods adjacent to said second apertures.

2. An apparatus for the inspection of boiling water reactor fuel assemblies as recited in claim 1, wherein said probe is moved at its lower end by an x-y scanning bridge to cause said probe to pivot about said ball joint.

3. An apparatus for the inspection of boiling water reactor fuel assemblies as recited in claim 1, wherein said probe comprises an ultrasonic transducer which detects the presence of water inside a fuel rod by transmitting an ultrasonic pulse to said fuel rod and measuring the strength of the received signal.

4. An apparatus for the inspection of boiling water reactor fuel assemblies as recited in claim 1, wherein said ball joint is located in said nosepiece.

5. An apparatus for the inspection of boiling water reactor fuel assemblies as recited in claim 1, wherein said pivot point is located below said nosepiece.

6. An apparatus for the inspection of boiling water reactor fuel assemblies as recited in claim 4, wherein said ball joint is located in the non-symmetric trident of said tripod with respect to said fuel rods.

7. An apparatus for the inspection of boiling water reactor fuel assemblies as recited in claim 5, wherein said ball joint is located below the non-symmetric trident of said tripod with respect to said fuel rods.

8. An apparatus for the inspection of boiling water reactor fuel assemblies as recited in claim 6, wherein said ball joint is located substantially centrally within said non-symmetric trident.

9. An apparatus for the inspection of boiling water reactor fuel assemblies as recited in claim 7, wherein said ball joint is located substantially centrally below said non-symmetric trident.

10. An apparatus for the inspection of boiling water reactor fuel assemblies as recited in claim 6, further comprising a second ball joint located in one of the two symmetric tridents with respect to said fuel rods to allow two inspections to occur in parallel using two probes.

11. An apparatus for the inspection of boiling water reactor fuel assemblies as recited in claim 10, further comprising a third ball joint located in the second of the two symmetric tridents with respect to said fuel rods to allow multiple inspections to occur in parallel using multiple probes.

12. An apparatus for the inspection of boiling water reactor fuel assemblies, each fuel assembly comprising a plurality of fuel rods and upper and lower tie plates, said upper and lower tie plates each comprising grids having first apertures for supporting the respective upper and lower ends of said fuel rods and having second apertures which allow coolant water to flow between said fuel rods, said fuel assembly further comprising on its lower end, adjacent to and covering said lower tie plate, a nosepiece in the shape of an inverted tripod, said apparatus comprising:
    (a) a probe for detecting and localizing the presence of water inside said fuel rods, said probe being pivotable and insertable into each of said second apertures for detecting and localizing the presence of water inside said fuel rods adjacent to said apertures; and
    (b) a goniometric cradle disposed below said nosepiece, said probe being moved at its lower end by a two-probe to pivot, such that it is insertable into each of said second apertures for detecting and localizing the presence of water inside said fuel rods adjacent to said second aperture.

13. A method for the inspection of boiling water reactor fuel assemblies, each fuel assembly comprising a plurality of fuel rods and upper and lower tie plates, said upper and lower tie plates each comprising grids having first apertures for housing the respective upper and lower ends of said fuel rods and having second apertures which allow coolant water to flow through said fuel rods, said fuel assembly further comprising on its lower end, adjacent to and covering said lower tie plate, a nosepiece in the shape of an inverted tripod, said method comprising the steps of:

(a) pivoting a probe about a single pivot point disposed below said lower tie plate to allow said probe to be inserted in each of said second apertures; and (b) inserting said probe into said second apertures to detect and localize the presence of water inside said fuel rods adjacent to said second apertures.

14. A method for the inspection of boiling water reactor fuel assemblies as recited in claim 13, wherein said probe is inserted into every fourth second aperture, said probe being rotated inside each second aperture to inspect each of the surrounding fuel rods.

15. A method for the inspection of boiling water reactor fuel assemblies as recited in claim 13, wherein said pivot point is located in said nosepiece.

16. A method for the inspection of boiling water reactor fuel assemblies as recited in claim 13, wherein said pivot point is located below said nosepiece.

17. A method for the inspection of boiling water reactor fuel assemblies as recited in claim 15, wherein said pivot point is located in the non-symmetric trident of said tripod with respect to said fuel rods.

18. A method for the inspection of boiling water reactor fuel assemblies as recited in claim 16, wherein said pivot point is located below the non-symmetric trident of said tripod with respect to said fuel rods.

19. A method for the inspection of boiling water reactor fuel assemblies as recited in claim 17, wherein said pivot point is located substantially centrally within said non-symmetric trident.

20. A method for the inspection of boiling water reactor fuel assemblies as recited in claim 18, wherein said pivot point is located substantially centrally below said non-symmetric trident.

21. A method for the inspection of boiling water reactor fuel assemblies as recited in claim 17, further comprising the step of passing a second probe through a second pivot point located in one of the two symmetric tridents with respect to said fuel rods to allow two inspections to occur in parallel.

22. A method for the inspection of boiling water reactor fuel assemblies as recited in claim 21, further comprising the step of passing a third probe through a third pivot point located in the second of the two symmetric tridents with respect to said fuel rods to allow three inspections to occur in parallel.

23. A method for the inspection of boiling water reactor fuel assemblies as recited in claim 13, wherein said probe detects the presence of water inside a fuel rod by transmitting an ultrasonic pulse to said fuel rod and measuring the strength of the received signal.

24. A method for the inspection of boiling water reactor fuel assemblies as recited in claim 13, wherein said pivot point comprises a ball joint with a central aperture through which said probe passes.

25. A method for the inspection of boiling water reactor fuel assemblies as recited in claim 24, further comprising the step of moving said probe at its lower end with an x-y scanning bridge to cause said probe to pivot about said ball joint.

26. A method for the inspection of boiling water reactor fuel assemblies as recited in claim 13, further comprising the step of moving said probe at its lower end with a two-stage goniometric cradle which, when rotated, causes said probe to pivot about said pivot point.

27. A method for the inspection of boiling water reactor fuel assemblies as recited in claim 13, further comprising the step of moving said probe at its lower end with a goniometric cradle disposed on a rotational table to cause said probe to pivot about said pivot point.

28. A method for the inspection and maintenance of boiling water reactor fuel assemblies, each fuel assembly comprising a plurality of fuel rods and upper and lower tie plates, said upper and lower tie plates each comprising grids having first apertures for supporting the respective upper and lower ends of said fuel rods and having second apertures which allow coolant water to flow between said fuel rods, said fuel assembly further comprising on its lower end, adjacent to and covering said lower tie plate, a nosepiece in the shape of an inverted tripod, said method comprising the steps of:

(a) pivoting a tool about a single pivot point disposed below said lower tie plate to allow said tool to access all of said nosepiece and each of said second apertures;

(b) performing inspection and maintenance tasks within said fuel assembly using said tool.

* * * * *